US011688160B2

(12) United States Patent
Yao

(10) Patent No.: US 11,688,160 B2
(45) Date of Patent: Jun. 27, 2023

(54) METHOD OF GENERATING TRAINING DATA FOR TRAINING A NEURAL NETWORK, METHOD OF TRAINING A NEURAL NETWORK AND USING NEURAL NETWORK FOR AUTONOMOUS OPERATIONS

(71) Applicant: Hengshuai Yao, Markham (CA)

(72) Inventor: Hengshuai Yao, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 1121 days.

(21) Appl. No.: 16/248,543

(22) Filed: Jan. 15, 2019

(65) Prior Publication Data

US 2019/0220744 A1 Jul. 18, 2019

Related U.S. Application Data

(63) Continuation-in-part of application No. 15/873,609, filed on Jan. 17, 2018, now abandoned.

(51) Int. Cl.
*G06N 3/08* (2023.01)
*G06N 3/04* (2023.01)
(Continued)

(52) U.S. Cl.
CPC ............ *G06V 10/82* (2022.01); *G05D 1/0088* (2013.01); *G06F 17/16* (2013.01); *G06F 18/214* (2023.01);
(Continued)

(58) Field of Classification Search
CPC ............ G06N 3/08; G06N 3/04; G06V 10/95; G06V 20/56; G06V 20/586; G05D 1/0088;
(Continued)

(56) References Cited

U.S. PATENT DOCUMENTS 6,999,950 B1 2/2006 Linneberg
8,626,565 B2 1/2014 Petroff
(Continued)

FOREIGN PATENT DOCUMENTS

CN 105137967 A 12/2015
CN 107367929 A 11/2017
(Continued)

OTHER PUBLICATIONS

P. Wang and C. -Y. Chan, "Formulation of deep reinforcement learning architecture toward autonomous driving for on-ramp merge," 2017 IEEE 20th International Conference on Intelligent Transportation Systems (ITSC), 2017, pp. 1-6 (Year: 2017).*
(Continued)

*Primary Examiner* — Kamran Afshar
*Assistant Examiner* — Brian J Hales

(57) ABSTRACT

A method of generating training data for training a neural network, method of training a neural network and using a neural network for autonomous operations, related devices and systems. In one aspect, a neural network for autonomous operation of an object in an environment is trained. Policy values are generated based on a sample data set. An approximate action-value function is generated from the policy values. A set of approximated policy values is generated using the approximate action-value function for all states in the sample data set for all possible actions. A training target for the neural network is calculated based on the approximated policy values. A training error is calculated as the difference between the training target and the policy value for the corresponding state-action pair in the sample data set. At least some of the parameters of the neural network are updated to minimize the training error.

36 Claims, 8 Drawing Sheets

(51) Int. Cl.
| | |
|---|---|
| *G06F 17/16* | (2006.01) |
| *G06F 18/214* | (2023.01) |
| *G06V 10/82* | (2022.01) |
| *G06V 20/56* | (2022.01) |
| *G06V 10/764* | (2022.01) |
| *G06V 10/776* | (2022.01) |
| *G05D 1/00* | (2006.01) |
| *G08G 1/16* | (2006.01) |
| *G06V 10/94* | (2022.01) |
| *G06F 18/21* | (2023.01) |
| *G06F 18/2413* | (2023.01) |
| *G06G 1/16* | (2006.01) |
| *G05D 1/02* | (2020.01) |
| *G06V 20/58* | (2022.01) |

(52) U.S. Cl.
CPC ...... *G06F 18/217* (2023.01); *G06F 18/24143* (2023.01); *G06N 3/04* (2013.01); *G06N 3/08* (2013.01); *G06V 10/764* (2022.01); *G06V 10/776* (2022.01); *G06V 10/95* (2022.01); *G06V 20/56* (2022.01); *G08G 1/16* (2013.01); *G05D 1/0231* (2013.01); *G05D 1/0257* (2013.01); *G06V 20/586* (2022.01)

(58) Field of Classification Search
CPC .... G05D 1/0231; G05D 1/0257; G06F 17/16; G06K 9/6256; G06K 9/6262; G06K 9/6274; G08G 1/16
See application file for complete search history.

(56) References Cited

U.S. PATENT DOCUMENTS

| | | |
|---|---|---|
| 9,443,192 B1 | 9/2016 | Cosic |
| 2004/0042652 A1 | 3/2004 | Ii et al. |
| 2015/0100530 A1 | 4/2015 | Mnih et al. |
| 2017/0076199 A1 | 3/2017 | Zhang et al. |
| 2017/0185087 A1 | 6/2017 | Petroff |
| 2017/0186125 A1 | 6/2017 | Petroff |
| 2017/0293844 A1 | 10/2017 | Gombolay et al. |
| 2017/0330586 A1 | 11/2017 | Roblek et al. |

FOREIGN PATENT DOCUMENTS

| | | | |
|---|---|---|---|
| WO | 2004063769 A2 | 7/2004 | |
| WO | WO-2017120336 A2 * | 7/2017 | ............... G06N 3/08 |

OTHER PUBLICATIONS

H. Sasaki, T. Horiuchi and S. Kato, "A study on vision-based mobile robot learning by deep Q-network," 2017 56th Annual Conference of the Society of Instrument and Control Engineers of Japan (SICE), 2017, pp. 799-804 (Year: 2017).*

H. Yao, C. Szepesvari, "Approximate Policy Iteration with Linear Action Models," 2012 Proceedings of the Twenty-Sixth AAAI Conference on Artificial Intelligence, 2012 (Year: 2012).*

K. Kashihara, "Deep Q learning for traffic simulation in autonomous driving at a highway junction," 2017 IEEE International Conference on Systems, Man, and Cybernetics (SMC), 2017, pp. 984-988 (Year: 2017).*

Jonathan Tremblay , Christopher Dragert and Clark Verbrugge, Target selection for AI companions in FPS games, Proceedings of the 9th International Conference on Foundations of Digital Games, 2014, http://gram.cs.mcgill.ca/papers/tremblay-14-target.pdf.

Unknown Authors, Create An AI Bot in Blueprint: Unreal Engine, Epic Games, at least as early as Oct. 4, 2017, https://wiki.unrealengine.com/Create_An_AI_Bot_in_Blueprint.

Unknown Authors, Q-learning, Wikipedia, at least as early as Oct. 4, 2017, https://en.wikipedia.org/wiki/Q-learning.

Unknown Authors, A Painless Q-Learning Tutorial, Wikipedia, at least as early as Oct. 4, 2017, http://mnemstudio.org/path-finding-q-learning-tutorial.htm.

* cited by examiner

METHOD OF GENERATING TRAINING DATA FOR TRAINING A NEURAL NETWORK, METHOD OF TRAINING A NEURAL NETWORK AND USING NEURAL NETWORK FOR AUTONOMOUS OPERATIONS

RELATED APPLICATION DATA

The present application is a continuation-in-part of non-provisional U.S. patent application Ser. No. 15/873,609, filed Jan. 17, 2018, the entire content of which is incorporated herein by reference.

TECHNICAL FIELD

The present disclosure relates to neural networks, and in particular, to a method of generating training data for training a neural network, method of training a neural network and using a neural network for autonomous operations, related devices and systems.

BACKGROUND

Vehicle driver assistance systems that enhance the awareness and safety of human drivers and autonomous vehicles increase driver safety and convenience. Autonomous parking and driving are important aspects of autonomous vehicles. However, as with other aspects of autonomous vehicles, autonomous operations such as autonomous parking and driving remain a developing field and improvements in autonomous parking and driving are desirable.

Deep reinforcement learning based artificial intelligence (AI) systems require a very large amount of data and training time. For example, the deep Q-learning network (DQN) is one of the most popular algorithms in deep reinforcement learning based AI systems. The DQN was developed by Google DeepMind™ and used in AlphaGo to beat the human GO champion in 2016. However, the DQN learns very slowly and requires a lot of data to learn a good policy. Within deep reinforcement learning, a policy is a rule for selecting an action in a given state. The policy may be defined as a mapping of a set of states to a set of actions. The DQN also requires considerable amount of training time and computation to converge. Even for very simple games, DeepMind's research shows that the DQN requires millions of training samples to learn a very simple policy. The reason is that the DQN is like a stochastic gradient update and the targets computed by the DQN keep changing too quickly during training iterations. The DQN is also not guaranteed to converge and the output policy may be very poor. For AI based vehicle driver assistance and vehicle automation, improved neural networks and methods of training are required.

SUMMARY

The present discourse provides a method of deep reinforcement based learning that may be used in advanced driver-assistance systems (ADAS) or autonomous self-driving vehicles, among other potential applications. In one aspect, the present disclosure provides a method of parking spot localization and parking of a vehicle in a shared process. Existing parking assist systems required two separate processes: identification of a parking spot and parking of the vehicle. The normal practice is to use computer vision technology to identify parking spots based on parking markings, and execute a heuristic, rule-based computer program to execute parking and moving the vehicle to a targeted parking spot. A limitation of this practice is that fixed rule-based parking performance is poor and typically requires human drivers to park the vehicle close to the parking spot to make the parking process easier for the vehicle control system to perform. The method of the present disclosure may be used in a variety of parking scenarios (e.g., forward, backward, parallel, etc.) and may locate a parking spot and execute parking at the same time. It is also contemplated that the method of the present disclosure may be used for autonomous driving.

In accordance with one aspect of the present disclosure, there is provided a method of training a neural network for autonomous operation of an object in an environment. Policy values are generated based on a sample data set. An approximate action-value function is generated from the policy values. A set of approximated policy values is generated using the approximate action-value function for all states in the sample data set for all possible actions. A training target for the neural network is calculated based on the approximated policy values. A training error is calculated as the difference between the training target and the policy value for the corresponding state-action pair in the sample data set. At least some of the parameters of the neural network are updated to minimize the training error.

In accordance with another aspect of the present disclosure, there is provided a method of training a neural network for autonomous operation of an object in an environment. A sample data set D $\{(s_i, a_i, s_{i+1}, r_i)\}$ is received by the neural network, wherein $s_i$ is a current state of the object in the environment, $a_i$ is the action chosen for the current state, $s_{i+1}$ is a subsequent state of the object and the environment and $r_i$ is a reward value for taking an action, $a_i$, in a state, $s_i$, the value of which is determined in accordance with a reward function. A first set of policy values $Q(s_i, a_i)$ is generated for each state-action pair $s_i$, $a_i$ in a sample data set D $\{(s_i, a_i, s_{i+1}, r_i)\}$ using an action-value function denoted the Q function. A second set of policy values $Q(s_{i+1}, a)$ is generated for each subsequent state $s_{i+1}$ for all tuples $(s_i, a_i, s_{i+1}, r_i)$ in the sample data set D for each action in the set of all possible actions using the Q function. An approximate action-value function, denoted the Q* function, is generated from the first set of policy values $Q(s_i, a_i)$ for the current state $s_i$ and the action $a_i$ selected for the current state $s_i$ and the second set of policy values $Q(s_{i+1}, a)$ for the subsequent state $s_{i+1}$ after the selected action $a_i$. A training target is generated for the neural network using the Q* function. A training error is calculated as the difference between the training target and the policy value $Q(s_i, a_i)$ for the corresponding state-action pair in the sample data set D. At least some of the parameters of the neural network are updated to minimize the training error.

In accordance with a further aspect of the present disclosure, there is provided a system, comprising a processor, and a memory coupled to the processor storing executable instructions. The executable instructions, when executed by the processor, cause the processor to receive a sample data set D $\{(s_i, a_i, s_{i+1}, r_i)\}$, wherein $s_i$ is a current state of the object in the environment, $a_i$ is the action chosen for the current state, $s_{i+1}$ is a subsequent state of the object and the environment and $r_i$ is a reward value for taking an action, $a_i$, in a state, $s_i$, the value of which is determined in accordance with a reward function. The executable instructions, when executed by the processor, cause the processor to apply, to the sample data set, a multi-layer neural network, each layer in the multi-layer neural network comprising a plurality of nodes, each node in each layer having a corresponding weight, to perform the operations described hereinafter. A first set of policy values $Q(s_i, a_i)$ is generated for each state-action pair $s_i$, On a sample data set D $\{(s_i, a_i, s_{i+1}, r_i)\}$ using an action-value function denoted the Q function. A second set of policy values $Q(s_{i+1}, a)$ is generated for each subsequent state $s_{i+1}$ for all tuples in the sample data set D for each action in the set of all possible actions using the Q function. An approximate action-value function, denoted the $Q^*$ function, is generated from the first set of policy values $Q(s_i, a_i)$ for the current state $s_i$ and the action $a_i$ selected for the current state $s_i$ and the second set of policy values $Q(s_{i+1}, a)$ for the subsequent state $s_{i+1}$ after the selected action $a_i$. A training target is generated for the neural network using the $Q^*$ function. A training error is calculated as the difference between the training target and the policy value $Q(s_i, a_i)$ for the corresponding state-action pair in the sample data set D. At least some of the parameters of the neural network are updated to minimize the training error.

In accordance with a further aspect of the present disclosure, there is provided a vehicle control system. The vehicle control system comprises a plurality of sensors for sensing a current state of an object and an environment in which the object is located. The vehicle control system also comprises a multi-layer neural network coupled to the plurality of sensors. Each layer in the multi-layer neural network comprises a plurality of nodes. Each node in each layer having a corresponding weight. The neural network is configured to encode a current state representing a vehicle in the environment in accordance with sensor data received from the plurality of sensors. The neural network is configured receive a plurality of possible actions. A predicted subsequent state of the vehicle in the environment is then determined based on the current state for each possible action in the plurality of possible actions. For each action in the plurality of possible actions, the predicted subsequent state is evaluated by determining a policy value in accordance with a policy value function, the predicted subsequent state and the respective action in the plurality of possible actions. An action is selected from the plurality of possible actions determined to generate a maximum policy value.

In some or all of the above, the vehicle control system causes the vehicle to perform the selected action.

In some or all of the above, each possible action is defined by an action vector comprising a steering angle for a steering unit, a throttle value for a throttle unit and a braking value for a braking unit.

In some or all of the above, the policy function maximizes a reward associated with the predicted subsequent state.

In some or all of the above, the neural network is configured to: receive a plurality of possible action sequences, each possible action sequences comprising one or more actions; for each possible action sequences: determine one or more predicted subsequent states of the vehicle in the environment based on the current state for each possible action in the possible action sequence; and evaluate each of the one or more predicted subsequent by determining a policy value in accordance with a policy value function, the predicted subsequent state and the respective action in the possible action sequence; and select an action sequence from the plurality of possible action sequences determined to generate a maximum policy value.

In some or all of the above, the neural network is configured to: for each possible action sequence, predict a plurality of state sequences each comprising a plurality of predicted subsequent states of the vehicle in the environment after performing each possible action sequence in the respective possible action sequence.

In some or all of the above, each predicted subsequent state in a state sequence is based on a previously observed or predicted state and a possible action in the possible action sequence.

In some or all of the above, the policy function maximizes a reward based on each of the one or more predicted subsequent states for each possible action sequence.

In some or all of the above, the action sequence is a parking or driving operation.

In some or all of the above, the reward is based on proximity to an optimum performance of the action sequence.

In accordance with a further aspect of the present disclosure, there is provided a method of performing an autonomous operation of a vehicle, comprising: encoding a current state representing a vehicle in the environment in accordance with sensor data received from the plurality of sensors; receiving a plurality of possible actions; determining a predicted subsequent state of the vehicle in the environment based on the current state for each possible action in the plurality of possible actions; for each action in the plurality of possible actions, evaluating the predicted subsequent state by determining a policy value in accordance with a policy value function, the predicted subsequent state and the respective action in the plurality of possible actions; and selecting an action from the plurality of possible actions determined to generate a maximum policy value.

In accordance with a further aspect of the present disclosure, there is provided a control system for an object. The control system comprises a processor, a plurality of sensors coupled to the processor for sensing a current state of an object and an environment in which the object is located, and a memory coupled to the processor. The memory stores executable instructions that, when executed by the processor, cause the control system to perform at least parts of the methods described above and herein. The control system may also comprise a neural network. In some examples, the object is a vehicle and the control system is a vehicle control system.

In accordance with a further aspect of the present disclosure, there is provided a vehicle comprising a mechanical system for moving the vehicle, a drive control system coupled to the mechanical system for controlling the mechanical system and a vehicle control system coupled to the drive control system, the vehicle control system having the features described above and herein.

In accordance with a yet further aspect of the present disclosure, there is provided a multi-layer neural network, each layer in the multi-layer neural network comprising a plurality of nodes, each node in each layer having a corresponding weight, wherein the neural network is configured to perform at least parts of the methods described above and herein.

In accordance with a yet further aspect of the present disclosure, there is provided a non-transitory machine readable medium having tangibly stored thereon executable instructions for execution by at least one processor of a computing device. The executable instructions, when executed by the at least one processor, cause the computing device to perform at least parts of the methods described above and herein.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments with reference to a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects, real or virtual.

Figure 1A:
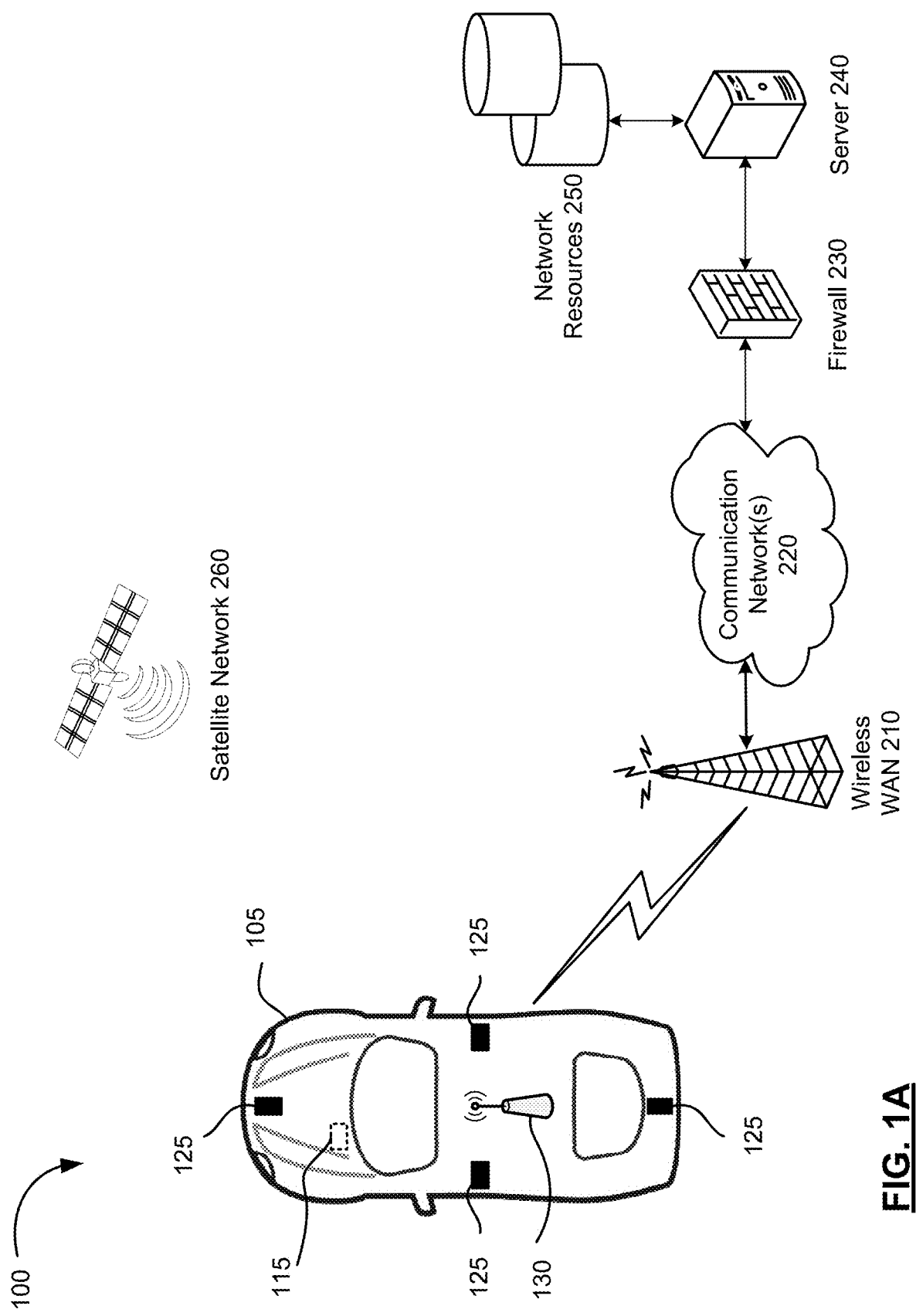
FIGS. 1A and 1B are schematic diagrams of a communication system suitable for practicing example embodiments of the present disclosure.
Figure 2:
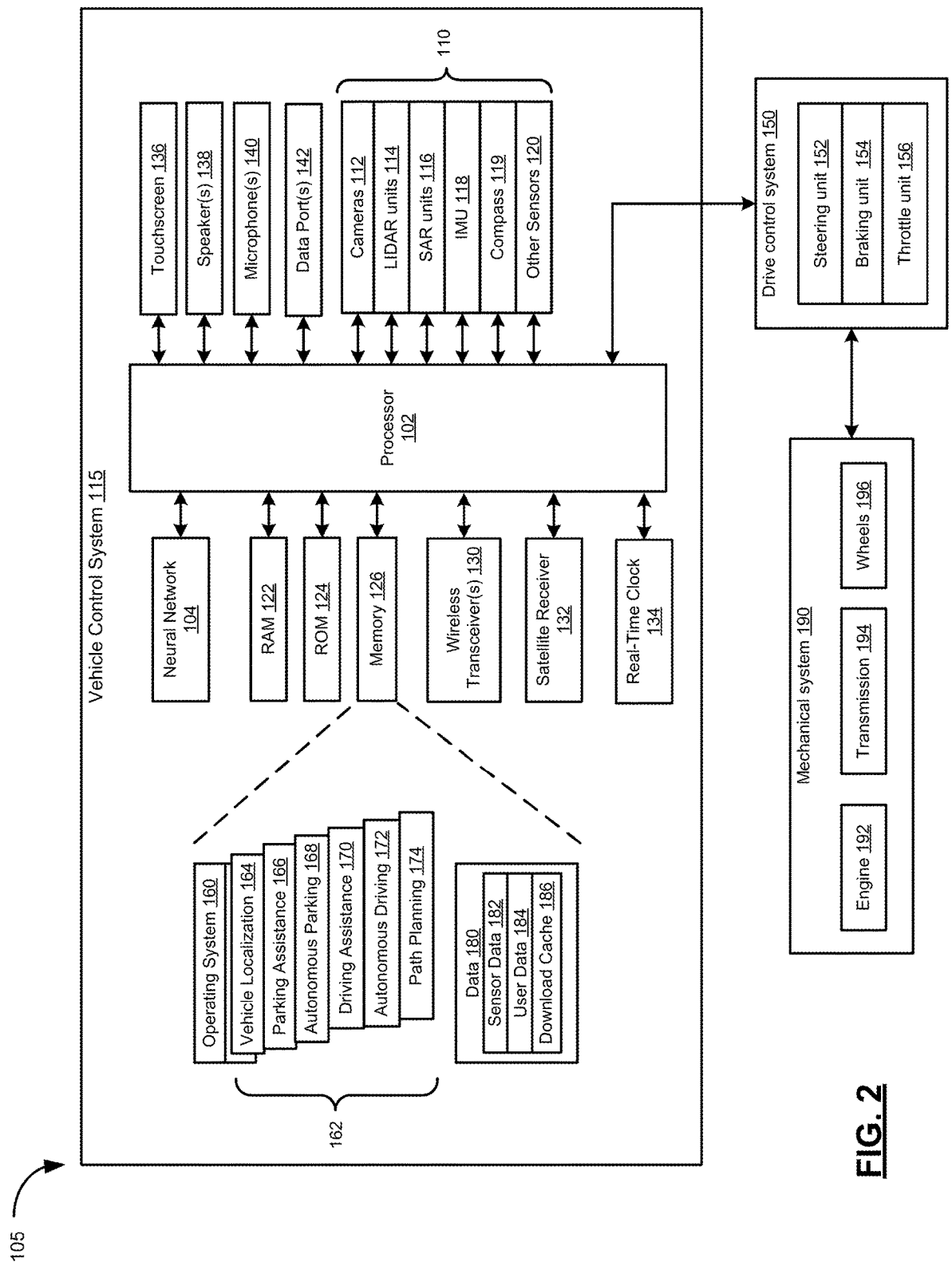
FIG. 2 is a block diagram of a vehicle comprising a vehicle control system in accordance with one example embodiment of the present disclosure.

FIG. 1A is a schematic diagram showing selected components of a communication system 100 in accordance with one example embodiment of the present disclosure. The communication system 100 comprises user equipment in the form of a vehicle control system 115 embedded in vehicles 105 (only one of which is shown in FIG. 1A). The vehicle control system 115 comprises a neural network 104 (FIG. 2). The neural network 104 comprises a neural network controller (not shown) comprising at least one processor. Alternatively, the neural network 104 may be located remotely and accessed wirelessly, for example by a server 240, rather than being located in the vehicle 105 as part of the vehicle control system 115.

The vehicle control system 115 is coupled to a drive control system 150 (FIG. 2) and a mechanical system 190 (FIG. 2) of the vehicle 105, as described below. The vehicle control system 115 allows the vehicle 105 to be operable in a fully-autonomous, semi-autonomous or fully user-controlled mode.

The vehicle control system 115 comprises a plurality of sensors 110 are located about the vehicle 105 and one or more wireless transceivers 130 each coupled to a controller, such as a processor 102 (FIG. 2), of the vehicle control system 115. The plurality of sensors 110 comprise one or more digital cameras 112, one or more LIDAR units 114, one or more radar units, such as one or more synthetic aperture radar (SAR) units 116, an inertial measurement unit (IMU) 118, an electronic compass 119 and possibly other sensors 120. The sensors 110, when active, repeatedly (e.g., in regular intervals) sense information and provide the sensed information to the vehicle control system 115 in real-time or near real-time.

The cameras 112 may capture static images or videos comprising a series of consecutive frames. The cameras 112 may be two-dimensional (2D) cameras or stereoscopic or three-dimensional (3D) cameras that may sense depth and the three-dimensional structure of the environment surrounding the vehicle 105. The cameras 112 may capture visible light, infrared or both. The IMU 118 senses the vehicle's specific force and angular rate using a combination of accelerometers and gyroscopes. The sensors 110 may be used to sense the three-dimensional structure of the environment surrounding the vehicle 105.

The vehicle control system 115 collects information using the sensors 110 about a local environment of the vehicle 105 (e.g., any immediately surrounding obstacles) as well as information from a wider vicinity (e.g., the LIDAR units 114 and SAR units 116 may collect information from an area of up to 100 m radius around the vehicle 105). The vehicle control system 115 may also collect information about a position and orientation of the vehicle 105 using the sensors 110 such as the IMU 118. The vehicle control system 115 may determine a linear speed (e.g. odometer), angular speed, acceleration and tire grip of the vehicle 105, among other factors, using the IMU 118 and possibly other sensors 120.

Figure 1B:
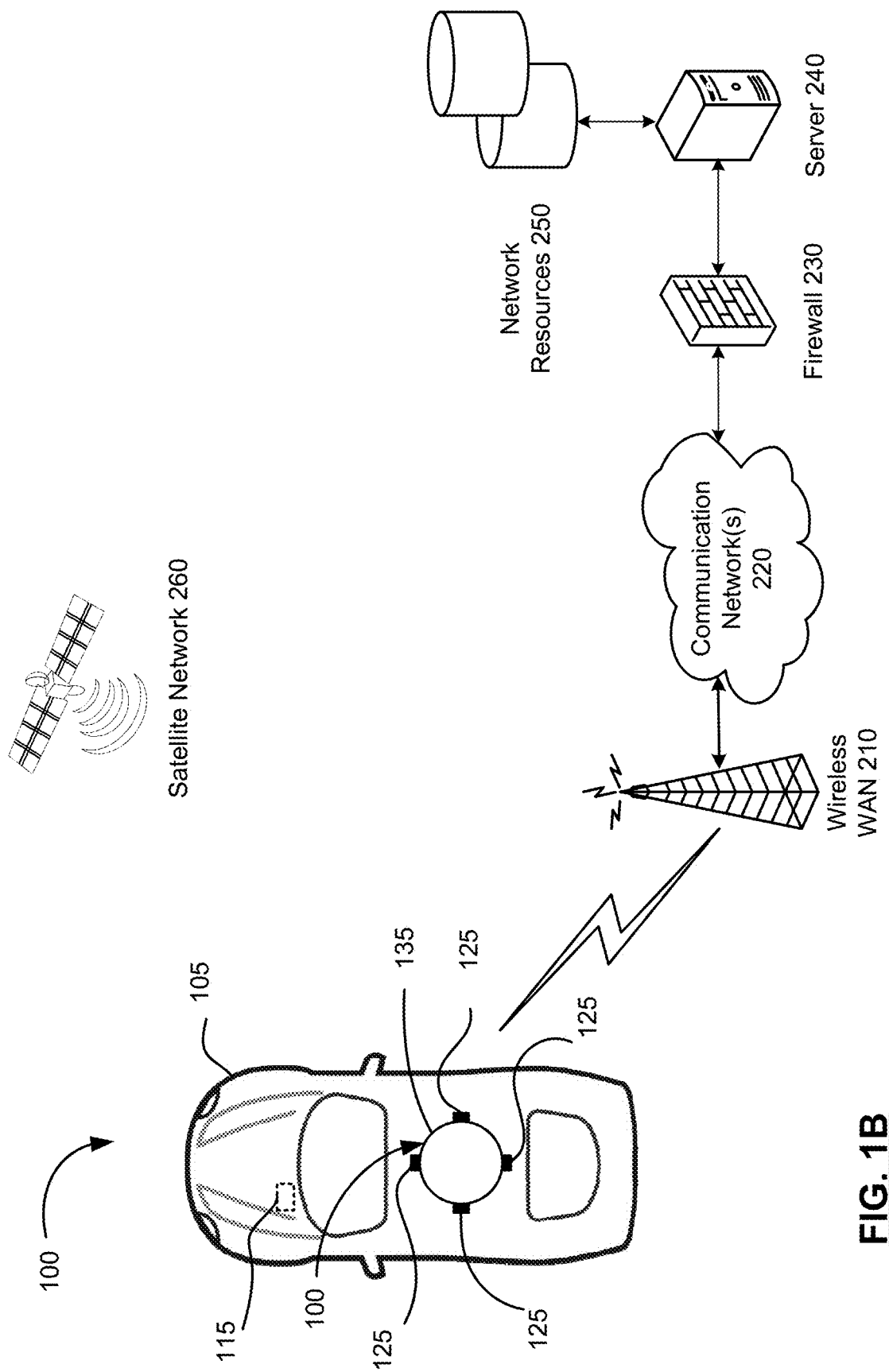

In the shown embodiment, there are four sensor units 125 located at the front, rear, left side and right side of the vehicle 105, respectively. The number and location of the sensor units 125 may be different in other embodiments. For example, FIG. 1B illustrates another embodiment in which the sensor units 125 are located in a housing 135, such as fixed or rotating carousel, that is mounted or otherwise located on the top (e.g., roof) of the vehicle 105. The sensor units 125 are located at the front, rear, left side and right side of the housing 135 (and consequently the vehicle 105), respectively, to scan the environment in front, rear, left side and right side of the vehicle 105. In the described embodiments, the sensor units 125 are oriented in four different directions to scan the environment in the front, rear, left side and right side of the vehicle 105.

The sensor units 125 comprise one or any combination of cameras 112, LIDAR units 114, and SAR units 116. The sensor units 125 are mounted or otherwise located to have different fields of view (FOVs) between adjacent sensor units 125 to capture the environment surrounding the vehicle 105. The different FOVs may be overlapping.

The wireless transceivers 130 enable the vehicle control system 115 to exchange data and optionally voice communications with a wireless wide area network (WAN) 210 of the communication system 100. The vehicle control system 115 may use the wireless WAN 210 to access the server 240, such as a driving assist server, via one or more communications networks 220, such as the Internet. The server 240 may be implemented as one or more server modules and is typically located behind a firewall 230. The server 240 is connected to network resources 250, such as supplemental data sources that may be used by the vehicle control system 115, for example, by the neural network 104.

The communication system 100 comprises a satellite network 260 comprising a plurality of satellites in addition to the WAN 210. The vehicle control system 115 comprises a satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Reference is next made to FIG. 2 which illustrates selected components of a vehicle 105 in accordance with an example embodiment of the present disclosure. As noted above, the vehicle 105 comprises a vehicle control system 115 that is connected to a drive control system 150 and a mechanical system 190. The vehicle 105 also comprises various structural elements such as a frame, doors, panels, seats, windows, mirrors and the like that are known in the art but that have been omitted from the present disclosure to avoid obscuring the teachings of the present disclosure. The processor 102 is coupled to a plurality of components via a communication bus (not shown) which provides a communication path between the components and the processor 102. The processor 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from a satellite network 260 that comprises a plurality of satellites which are part of a global or regional satellite navigation system, a real-time clock (RTC) 134, and a touchscreen 136. In some embodiments, the neural network controller (not shown) may be part of the processor 102.

The wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The wireless transceiver(s) 130 may send and receive signals over the wireless WAN 210. The wireless transceivers 130 may comprise a multi-band cellular transceiver that supports multiple radio frequency bands.

The wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The wireless transceivers 130 may also comprise a short-range wireless transceiver, such as a Bluetooth® transceiver, for communicating with a mobile computing device, such as a smartphone or tablet. The wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The RTC 134 typically comprises a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMO-LED) display, with a touch-sensitive input surface or overlay connected to an electronic controller. Additional input devices (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The vehicle control system 115 may also include other sensors 120 such as tire pressure sensors (TPSs), door contact switches, light sensors, proximity sensors, etc.

The drive control system 150 serves to control operations of the vehicle 105. The drive control system 150 comprises a steering unit 152, a braking unit 154 and a throttle (or acceleration) unit 156, each of which may be implemented as software modules comprising processor-executable instructions or control blocks within the drive control system 150. The steering unit 152, braking unit 154 and throttle unit 156 process, when in fully or semi-autonomous driving mode, received path information from a path planning system 174 stored in the memory 126 of the vehicle control system 115 and generate control signals to control the steering, braking and throttle of the vehicle 105, respectively to drive a planned path. The drive control system 150 may include additional components to control other aspects of the vehicle 105 including, for example, control of turn signals and brake lights.

The mechanical system 190 receives control signals from the drive control system 150 to operate the mechanical components of the vehicle 105. The mechanical system 190 effects physical operation of the vehicle 105. The mechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 of the vehicle control system 115 has stored thereon operating system software 160 comprising processor-executable instructions that are executed by the processor 102 as well as a number of software applications 162 in addition to the GUI. The software applications 162 include vehicle localization 164, parking assistance 166, autonomous parking 168, driving assistance 170 for semi-autonomous driving, autonomous driving 172 for fully autonomous driving, and path planning 174 applications. Each application comprises processor-executable instructions which can be executed by the processor 102. Other software applications 162 such as mapping, navigation, climate control, media player, telephone and messaging applications, etc. may also be stored in the memory 126. The execution by the processor 102 of the processor-executable instructions of one or more of the software applications 162 stored in the memory 126 causes the operations of the methods described herein to be performed.

Although shown as separate applications comprising separate processor-executable instructions, all or part of the vehicle localization 164, parking assistance 166, autonomous parking 168, driving assistance 170 for semi-autonomous driving, autonomous driving module 172 or path planning 174 applications may be combined with one or more of the other software applications in other embodiments. In other embodiments, the vehicle localization 164, parking assistance 166, autonomous parking 168, driving assistance 170 for semi-autonomous driving, autonomous driving module 172, and path planning 174 applications may be separate software modules that are part of an autonomous vehicle operation application. In this embodiment, each software module comprises processor-executable instructions that can be executed by the processor 102 to cause the operations of the methods described herein to be performed.

The memory 126 also stores a variety of data 180. The data 180 may comprise sensor data 182 sensed by the sensors 110, user data 184 comprising user preferences, settings and optionally personal media files (e.g., music, videos, directions, etc.), and a download cache 186 comprising data downloaded via the wireless transceivers 130. The sensor data 182 comprises image data 312 representative of images captured by the cameras 112 and provided to the memory 126 by the cameras 112, LIDAR data 314 from the LIDAR units 114, RADAR data 316 such as SAR data received from the SAR units 116, and possibly other sensor data 318 received from other sensors 120 such as the IMU 118. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

Figure 3:
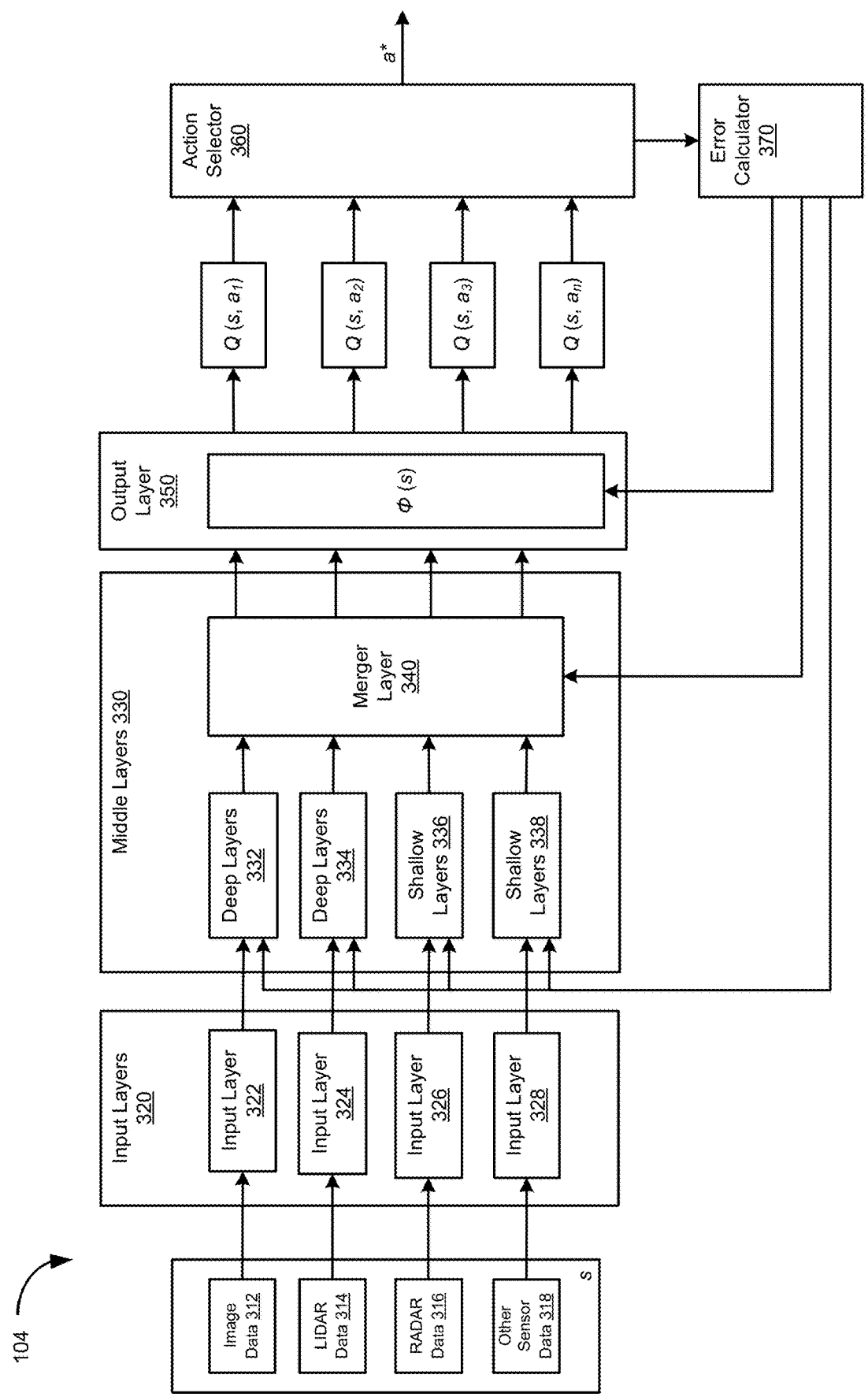
FIG. 3 is a schematic diagram which illustrates a neural network of the vehicle control system in accordance with one example embodiment of the present disclosure.

Reference is next made to FIG. 3 which illustrates the neural network 104 in accordance with one example embodiment of the present disclosure. The neural network 104 comprises a plurality of layers comprising an input layer 320, a plurality of middle (hidden) layers 330, and an output layer 350. Each of the layers 320, 330, 350 of the neural network 104 comprises a plurality of nodes (or neurons).

The nodes of the layers 320, 330, 350 are connected, typically in series. The nature of the connection between the nodes of the layers 320, 330, 350 may vary between embodiments. In some embodiments, the nodes of each of the layers 320, 330, 350 may operate independently of the other nodes, allowing for parallel computing.

Figure 4:
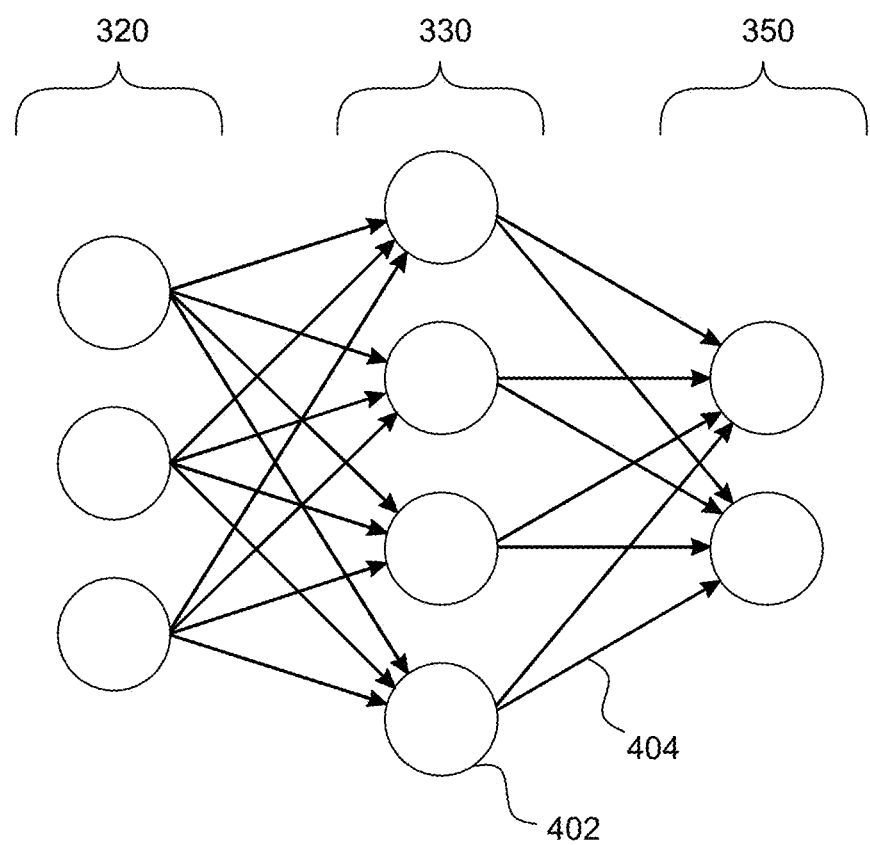
FIG. 4 is a schematic diagram illustrating the relationship between nodes in a neural network.

For the purpose of explaining the relationship between nodes of the neural network 104, reference will now be made to FIG. 4 which illustrates a simple example configuration of the neural network 104 in schematic diagram form. The input layer 320, the middle (hidden) layers 330 (only one of which is shown in FIG. 4), and output layer 350 each comprise a plurality of nodes 402 (only one of which is labelled in FIG. 4). The output of each node 402 in a given layer is connected to the output of one or more nodes 402 in a subsequent layer, as indicated by connections 404 (only one of which is labelled in FIG. 4). Each node 402 is a logical programming unit comprising processor-executable instructions, which when executed by one or more processors, performs an activation function (also known as a transfer function) for transforming or manipulating data based on its inputs, a weight (if any) and bias factor(s) (if any) to generate an output. The inputs, weights and bias factors vary between nodes 402 within each layer of the neural network 104 and between layers of the neural network 104. The activation function of each node 402 results in a particular output in response to particular input(s), weight(s) and bias factor(s). The inputs of each node 402 may be scalar, vectors, matrices, objects, data structures and/or other items or references thereto. Each node 402 may store its respective activation fiction, weight (if any) and bias factors (if any) independent of other nodes 402.

Examples of activation functions include mathematical functions (i.e., addition, subtraction, multiplication, divisions, etc.), object manipulation functions (i.e., creating an object, modifying an object, deleting an object, appending objects, etc.), data structure manipulation functions (i.e., creating a data structure, modifying a data structure, deleting a data structure, creating a data field, modifying a data field, deleting a data field, etc.), and/or other transformation functions depending on the type of input(s). In some examples, the activation function comprises one or both of summing and mapping functions.

Referring again to FIG. 3, each node of the input layer 320 receives sensor data 182 obtained from the sensor units 125 as input. The sensor data 182 is typically received by the processor 102 from the sensor units 125 and stored in memory 126 for subsequent use by the neural network 104. Alternatively, the sensor data 182 may be received directly by the neural network 104 from the processor 102, or possibly even the sensor units 125, without being passed through the processor 102. In such alternatives, the sensor data 182 is typically stored in the memory 126 by a parallel process, possibly using a parallel commutation path, so that the sensor data 182 may be later accessed, for example, for diagnostic, auditing or other purposes. As described above, the sensor data 182 comprises image data 312 from the cameras 112, LIDAR data 314 from the LIDAR units 114, RADAR data 316 such as SAR data from the SAR units 116, and possibly other sensor data 318 from other sensors 120 such as the IMU 118. The data 312, 314, 316 and 318 comprises captured or measured data which may be, for example, in the form of vector, matrix or scalar depending on the type of data. In the shown embodiment, the image data 312 is received by a respective input layer 322, the LIDAR data 314 is received by a respective input layer 324, the RADAR data 316 is received by a respective input layer 326, and the other sensor data 318 is received by a respective input layer 328.

A weight may be set for each of the nodes of the input layers 320 and subsequent nodes of the middle layers 330 and the output layer 350 of the neural network 104. A weight is a numerical value, usually between 0 and 1, that indicates the connection strength between a node in one layer and a node in a subsequent layer. An offset (or bias) may also be set for each of the inputs of the input layers 320 and subsequent nodes of the middle layers 330 and the output layer 350 of the neural network 104.

A scalar product of the input of each of the input layers 320, its respective weight and bias factor (if any) are determined and output to a respective node of the first middle layer 330 which receives the scalar product as input. Each of the scalar products are concatenated into another vector, and another scalar product of the input of the first middle layer 330 and its respective weight and bias factor (if any) is determined and output to a node of the second middle layer 330 which receives the scalar product as input. This process is repeated in sequence through each of the middle layers 330 up to the output layer 350.

The number of middle layers 330, the number nodes in each of the layers 320, 330 and 350, and the connections between the nodes of each layer may vary between embodiments based on the input(s) (e.g., sensor data) and output(s) to the physical system (i.e., the vehicle control system 115, which are determined by the controllable elements of the vehicle 105). The weight and bias factor (if any) of each node and possibly even the activation function of the nodes of the neural network 104 are determined for optimal performance of an autonomous operation, such as parking or driving, through a reinforcement learning process described below.

In the shown example, the middle layers 330 comprise deep layers 332 and 334 and shallow layers 336 and 338 that receive data from the nodes of the input layers 320. The deep layers 332 receive image data from input layer 322, the deep layers 334 receive LIDAR data from input layer 324, the shallow layers 336 receive RADAR data from input layer 326, and the shallow layers 338 receive other sensor data from the input layer 328. The middle layers 330 also comprise a merger layer 340 which is connected to the output layer 350. The merger layer 340 merges the output of the deep layers 332, 334 and the shallow layers 336, 338 by concatenating the outputs (e.g., vectors) of the deep layers 332, 334 and the shallow layers 336, 338, and outputs the result to the output layer 350. Although the deep layers 332, 334 and the shallow layers 336, 338 are shown connected to the output layer 350 indirectly via the merger layer 340 in the shown embodiment, it is complemented that in other embodiments the deep layers 332, 334 and the shallow layers 336, 338 may be connected directly to the output layer 350 in addition to, or instead of, being indirectly connected by via the merger layer 340.

The merger layer 340 is a mapping (s) which accepts as input any state, s, to generate a vector that is output to the last layer 350 of the neural network 104. The mapping $\phi$ (s) is an encoded state representation output based on the sensor data for a state, s. The output of the last layer 350 comprises a number of policy values, denoted Q (s, a) for a given state, s, one for each action, a, based on a policy (or policy function), denoted $\pi$. The policy values are real values output by the neural network 104. The policy function $\pi$ is represented by the nodes of the output layer 350 (e.g., activation functions, weights, bias factors). A policy value Q (s, $a_i$) of any given action $a_i$ can be determined from the plurality of policy values Q (s, a) output by the output layer 350 using a lookup table of actions or a linear function. A second mapping $\phi$ (s, a) maps state-action pairs (s, a) to a corresponding vector of real values Q (s, a) using $\phi$ (s) and tabular action such as a linear function or lookup table. The second mapping $\phi$ (s,a) may be used in an approximate policy iteration (API) procedure, described below.

It will be appreciated that the neural network 104 receives as input a state of the vehicle 105 in the environment. The neural network 104 encodes this state and outputs a plurality of policy values Q (s, a), each representing the policy value Q of taking a given action, a, in a given state, s. This allows the optimal action to be determined from the plurality of policy values Q (s, a) by finding action that has the optimal outcome in a single forward pass of the neural network 104 rather than taking multiple forward passes should the neural network 104 receive both states and actions as inputs.

Each action has multiple dimensions. In the described example, each action has three dimensions: steering angle for the steering unit 152, a throttle value for a throttle unit 156 and a braking value for a braking unit 154. It will be appreciated that the steering angle, throttle value and braking value may have a value of zero in some scenarios. The state, s, includes not only the vehicle's state but also includes the environment's state (e.g., measurement of the vehicle 105 with respective to the environment) at the same time, t. For example, the state, s, at time, t, includes:

sensor data 182 including image data 312 representative of current views (i.e., images) of all the cameras 112 installed on the vehicle 105; LIDAR data 314 indicative of current LIDAR measurements; and RADAR data 316 indicative of current RADAR measurements; and other sensor data 318 indicative of sensory measurements such as current GNSS data from the satellite receiver 132, current compass reading, current IMU reading, current speed reading of a speedometer, etc.;

data derived from current and/or past other sensor data 318 including current distance from the vehicle's center to a lane axis, or when a lane is not available, the current distance from the vehicle's center to a predefined path, current distance from the vehicle's center to center line, left lane line, and right lane line, current distance to other environmental references, etc., current speed or velocity (e.g., based on a change in GNSS data between current and past sensor readings), etc.

An action selector 360 may be used to select the optimal action or action(s) based on the policy values Q (s, a) output by the output layer 350. An error calculator 370 is used to calculate an error of the neural network 104, if any, at least during the training of the neural network 104.

Figure 5A:
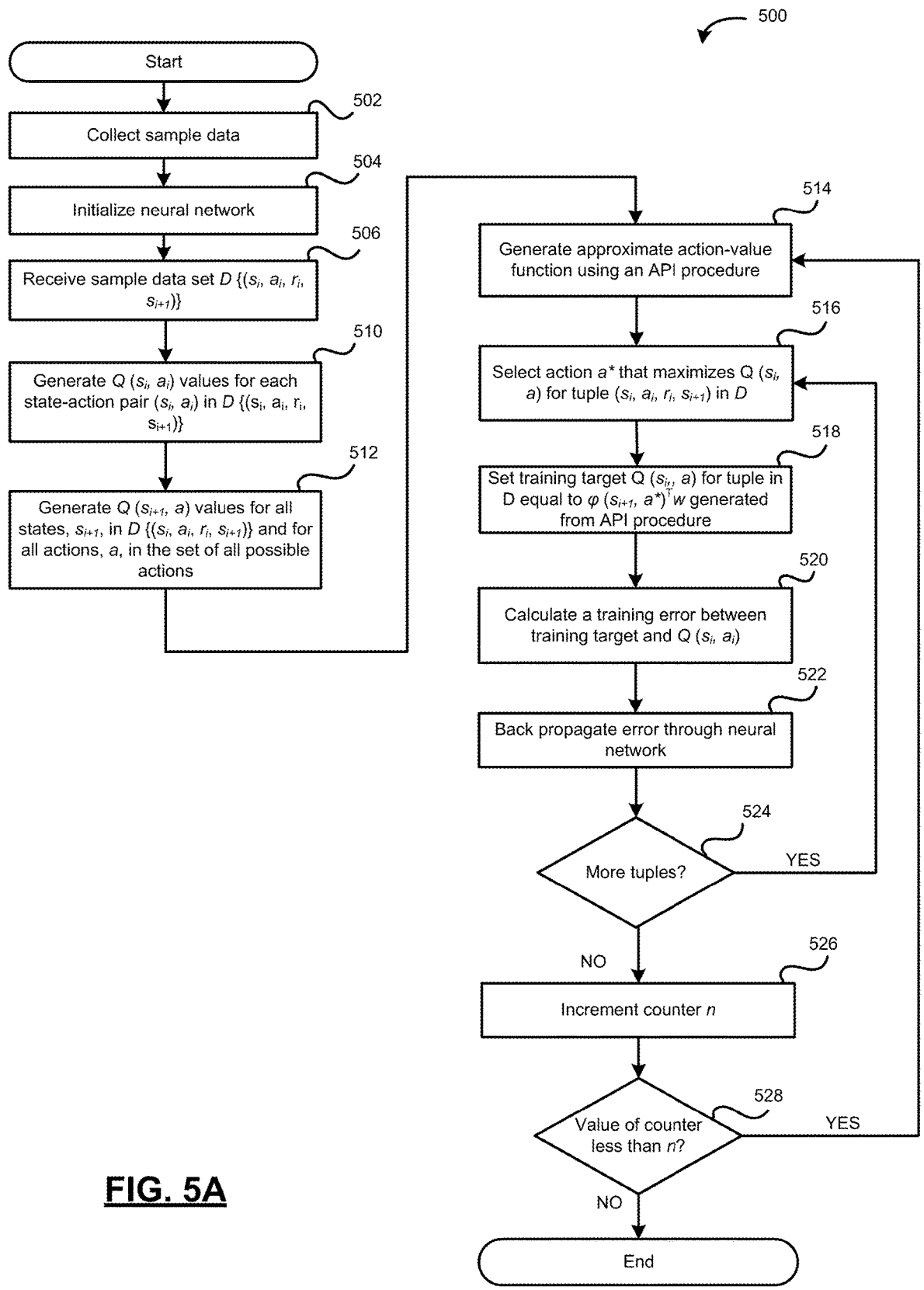
FIG. 5A is a flowchart illustrating an example method for training a neural network in accordance with one example embodiment of the present disclosure.

The nodes of the input layer 320 typically do not have activation functions. The nodes of the input layer 320 are typically little more than placeholders into which the input data is simply weighted and summed. The deep layers 332 encode the image data 312 received from the cameras 112, the deep layers 334 encode LIDAR data 314 received from the LIDAR units 114, the shallow layers 336 encode RADAR data 316 received from the SAR units 116, and the shallow layers 338 encode any other sensor data 318 received from other sensors 120. The shallow layers 336, 338 typically have only one hidden layer as a result of processing simpler input data and/or calculations (e.g., RADAR, IMU data). The deep layers 332, 334 have several hidden layers, often of various types, such as fully connected layers and convolution layers, as a result of processing more complex input data and/or calculations (e.g., image and LIDAR data). A different configuration of the middle layers 330 may be used in other embodiments Referring to FIG. 5A, an example method 500 for training the neural network 104 in accordance with one example embodiment of the present disclosure will be described. At least parts of the method 500 are carried out by software executed by a processor, such as the neural network controller or the processor 102 of the vehicle control system 115. The method 500 is typically performed offline.

At operation 502 of the method, a sample data set is obtained by the vehicle control system 115 in response to an operator (e.g., human driver) parking (or driving) the vehicle 105 repeatedly in various parking (or driving) scenarios, such as highway, parking lots, intersections, residential areas, roundabouts, etc. The sample data set D comprises a number of tuples in the form $(s_i, a_i, s_{i+1}, r_i)$, wherein $s_i$ is the current state of the vehicle 105 in the environment, $a_i$ is the action for the current state selected by operator parking (or driving) the vehicle 105, $s_{i+1}$ is the subsequent state of the vehicle 105 in the environment after the selected action $a_1$, and $r_i$ is a reward value for taking the selected action, $a_i$, in current state, $s_i$, the value of which is calculated in accordance with a reward function. It is noted that the states $s_i$ and $s_{i+1}$ are based on measurements from the sensor units 125 of the vehicle 105 in the environment and the selected action $a_i$ is made by an operator such as a human driver and not the neural network 104. The current state of the vehicle 105 in the environment, $s_i$, the action for the current state selected by operator parking (or driving) the vehicle 105, $a_i$, and the subsequent state of the vehicle 105 in the environment after the selected action $a_i$, $s_{i+1}$, of the sample data set D are measured by the sensor units 125 by the operator parking (or driving) the vehicle 105.

The reward value, $r_i$, of the sample data set D $\{(s_i, a_i, s_{i+1}, r_i)\}$ is a numerical value that represents a grade or score of an outcome of the selected action $a_i$ in the state $s_i$. The number of tuples in the sample data set D may vary. In one example, the number of tuples may be 10,000. In another example, the number of tuples may be 100,000. In yet another example, the number of tuples may be 1,000,000 or more. The reward value is the sum of all future rewards over a sequence of actions, such as a sequence of actions in a parking or driving operation during sample collection. The reward value may be based on proximity to optimum performance of the sequence of actions. The reward function used to calculate the reward value may be linear or nonlinear. The reward function may be defined by the neural network designer. The reward function may be defined by an equation in some embodiments. The reward function may be defined by a table or matrix. The reward value is calculated using the reward function after the sample collection by the vehicle control system 115 or other computing device.

At operation 504, the neural network 104 is initialized with random or arbitrary weights set by the neural network designer.

At operation 506, the neural network 104 receives the sample data set D $\{(s_i, a_i, s_{i+1}, r_i)\}$ as input.

At operation 510, the neural network 104 calculates a plurality of policy values Q $(s_1, a_i)$ for each state-action pair, $s_i, a_i$, for all tuples $(s_i, a_i, s_{i+1}, r_i)$ in the sample data set D $\{(s_i, a_i, s_{i+1}, r_i)\}$ using an action-value function denoted the Q function. The Q function provides a measure of the expected utility of taking a given action, a, in a given state, s, and following an optimal policy thereafter. A policy, denoted by $\pi$, is a rule that an agent follows in selecting actions given its current state. When an action-value function is learned, the optimal policy can be constructed by simply selecting the action with the highest value in each state. The Q function is predefined or prelearned by the neural network 104 using the Q-learning techniques.

At operation 512, the neural network 104 calculates a plurality of policy values Q $(s_{i+1}, a)$ for each subsequent state $s_{i+1}$ for all tuples $(s_i, a_i, s_{i+1}, r_i)$ in the sample data set D $\{(s_i, a_i, s_{i+1}, r_i)\}$ for each action in the set of all possible actions ($a \in A$) using the Q function. As noted above, each action has three dimensions: steering angle, throttle and braking. Although the number of possible actions may be large, the number of possible actions is finite and determinable. In contrast, the number of possible states is infinite. The set of all possible actions may be predetermined and calculated in advance or calculated on demand by the neural network 104.

At operation 514, an approximate action-value function, denoted the Q* function, that approximates policy values of a state-action pair (s, a) following an optimal policy function $\pi$. The Q* function is generated by the neural network 104 from the first set of policy values Q $(s_i, a_i)$ for the current state $s_i$ and action $a_i$ selected for the current state $s_i$ and the second set of plurality of policy values Q $(s_{i+1}, a)$ for the subsequent state $s_{i+1}$ after the selected action $a_i$, using an approximate policy iteration (API) procedure 530 shown in FIG. 5B and described below.

Figure 5B:
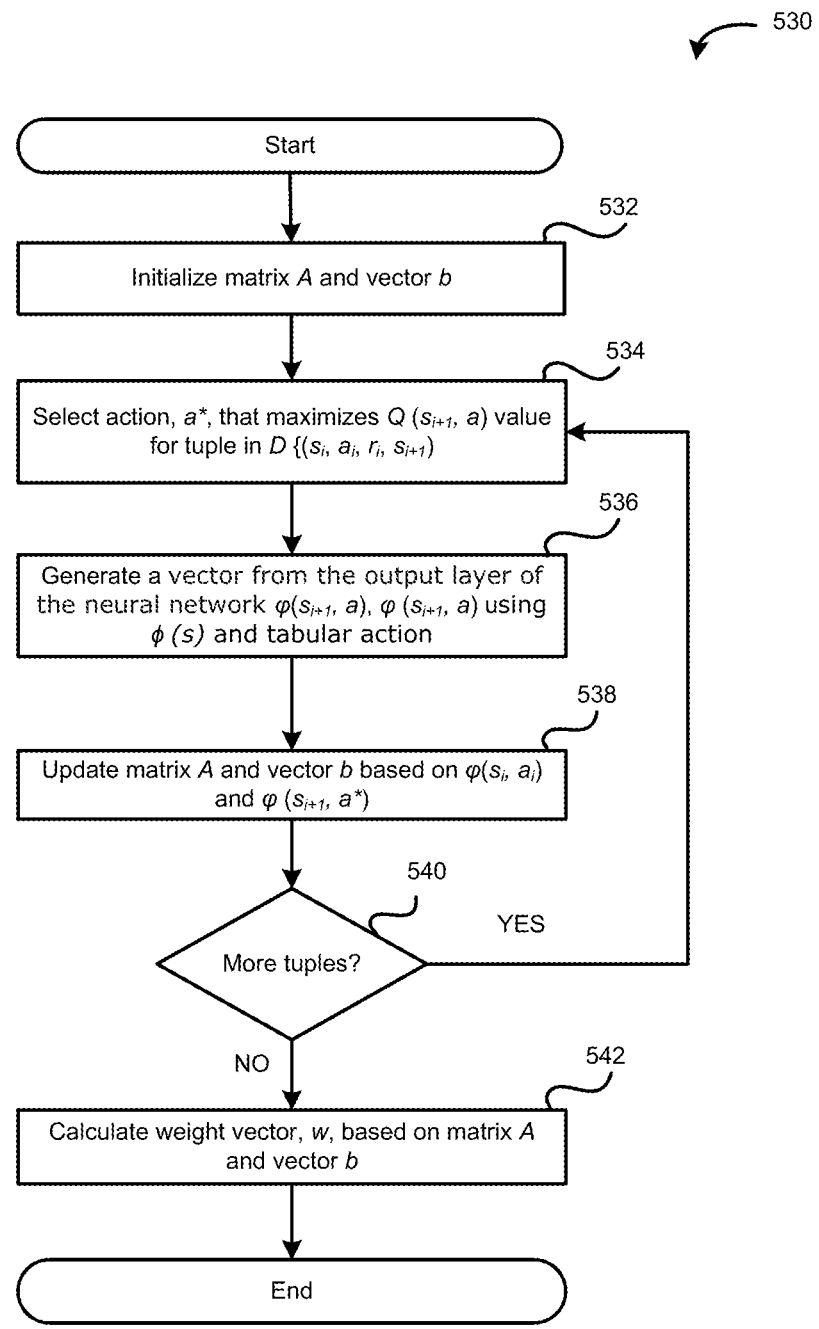
FIG. 5B is a flowchart illustrating an example approximate policy iteration (API) procedure used in the method of FIG. 5A in accordance with one example embodiment of the present disclosure.

Referring now to FIG. 5B, at operation 532 the neural network 104 initializes a matrix A and a vector b. At operation 534, for a tuple, t, in the form $(s_i, a_i, s_{i+1}, r_i)$ in the sample data set D $\{(s_i, a_i, s_{i+1}, r_i)\}$, the neural network 104 selects an action, a*, that results in the maximum value of Q $(s_{i+1}, a)$ from the set of all possible actions (a*=argmax$_a$Q $(s_{i+1}, a)$).

At operation 536, the neural network 104 generates a vector from the output layer of the neural network 104 $\varphi(s_i, a_i)$, $\varphi^*(s_{i+1}, a^*)$ using $\phi$ (s) and tabular action such as a linear function or lookup table. The vector represents an embedded feature vector, which corresponds to a vector of real values Q (s, a).

At operation 538, the neural network 104 updates the value of the matrix A and the vector b using Q $(s_i, a_i)$ and Q $(s_{i+1}, a^*)$ using the following equations:

$$A = A + \varphi(s_i, a_i)(\gamma \varphi(s_{i+1}, a^*) - \varphi(s_i, a_i))^T$$

$$b = b + \varphi(s_i, a_i) r_i$$

wherein $\gamma$ is a discount factor between 0 and 1 set by the neural network designer. A discount factor of 0 will consider only current rewards whereas a discount factor close to 1 will emphasize future rewards.

At operation 540, the neural network 104 determines whether any more tuples in the sample data set D have not been analyzed. When more tuples requiring processing remain, the operations return to operation 534. When no tuples requiring processing remain, processing proceeds to operation 542 and the neural network 104 calculates a weight vector $\omega$ based on the matrix A and the vector b in accordance with the following equation:

$$\omega = -A^{-1} b \quad (4)$$

The weight vector, $\omega$, represents the weights of the node(s) of the output layer 350 of the neural network 104. After the weight vector, $\omega$, is determined, the operations 530 end. The Q* function learned by the API procedure is a linear function of $\varphi(s_i, a)^T \omega$, as described below. The Q* function can be used to generate an approximation of the Q value of a state-action pair. Given an input state, s, the Q* function learned by the API procedure can be called a number of times to produce a number of values, $\varphi(s, a)$, one for each action. The φ values may be provided as training targets for the neural network 104. The use of the Q* function in training the neural network 104 is described below.

At operation 516, for a tuple, t, in the form $(s_i, a_i, s_{i+1}, r_i)$ in the sample data set D $\{(s_i, a_i, s_{i+i}, r_i)\}$, the neural network 104, selects an action, a*, that results in maximum value of Q $(s_i, a) = \varphi(s_i, a)^T \omega$ from the set of all possible actions (a* = argmax$_a$ Q $(s_i, a) = \varphi(s_i, a)^T \omega$).

At operation 518, neural network 104 sets a training target for the neural network 104 as Q $(s_i, a^*) = \varphi(s_i, a^*)^T \omega$, wherein a* is the action that results in maximum value of Q $(s_i, a) = \varphi(s_i, a)^T \omega$ from the set of all possible actions At operation 520, a training error is calculated as the difference between the training target and the calculated policy value Q (s, a) obtained from the sample data set D $\{(s_i, a_i, s_{i+1}, r_i)\}$.

At operation 522, the neural network 104 back propagates the calculated error as an error signal to the middle layers 330 of the neural network 104, i.e., to deep layers 332, 334, shallow layers 336, 338 and merger layer 340, and the output layer 350 of the neural network 104, to update the parameters (e.g., weights, bias factors, etc.) of the neural network 104, thereby reducing the error. In the described embodiment, the parameters of the neural network 104 are updated to minimize a mean square error (MSE) between the training target, an approximated Q value based on sample data set (i.e., $\varphi(s_i, a^*)^T \omega$), and the corresponding Q value (i.e., policy value Q (s, a)) obtained using the sample data set D. In some examples, the MSE is minimized using a least mean square (LMS) algorithm. In some examples, the neural network 104 uses a LMS algorithm to minimize the MSE between the training target and the corresponding Q value (i.e., policy value Q (s, a)) obtained using the sample data set D. In some examples, a gradient descent is used to minimize the MSE. In some examples, the MSE is defined in accordance with the following equation:

$$\sum_{i=1}^{n} (\varphi(s_i, a^*)^T \omega - Q(s_i, a_i))^2$$

wherein n is the number of tuples in the sample data set D, $\varphi(s_i, a^*)^T \omega$ is the training target and Q $(s_i, a_i)$ is the policy value for the corresponding state-action pair in the sample data set D, and wherein the sum is first over the states in the sample data set and then over all the actions.

At operation 524, the neural network 104 determines whether any more tuples in the sample data set D have not been analyzed. When more tuples requiring processing remain, the operations return to operation 516. When no tuples requiring processing remain, processing proceeds to operation 526 and the neural network 104 increments a counter. The counter is initialized at 1 during the first interaction and is incremented by 1 during each iteration of the operations 516 to 524.

At operation 528, the neural network 104 determines whether the value of the counter for the present iteration is less than n, wherein n is the number of iterations to be performed and is set by the neural network designer. In one example, the number of iterations is 5. In another example, the number of iterations is 10. In yet other examples, the number of iterations is 100. In yet other examples, the number of iterations is 1,000. When the value of the counter for the present iteration is less than n, processing returns to operation 514 and the Q* function is recalculated. When the value of the counter is n, the method 500 ends with a trained neural network 104. It will be appreciated that over many iterations, the parameters of the neural network 104 are updated so as to minimize the training error.

The output of method 500 is a trained neural network 104, denoted O. 8 refers to the collection of parameters in the trained neural network 104 while w refers to the weight vector of the output layer 350 of the trained neural network 104 learned from the method 500. After the neural network 104 is trained, it may be used in real-time autonomous operations, such as autonomous driving or parking operations for the vehicle 105 as described herein, in the selection of an action in the autonomous operations.

An example algorithm for training the neural network 104 in accordance with the method 500 is provided below:

--- input: A set of states in sample data set D = $\{s_i, a_i, s_{i+1}, r_i\}$.
output: The trained neural network θ.
Initialize the neural network 104 with random weights.
The output of the output layer 350 of the neural network 104 is Q:

Compute $Q$ $(s_i, a_i)$ for each state-action pair $(s_i, a_i)$ in the sample data set D $\{s_i, a_i, s_{i+1}, r_i\}$.

Compute $Q$ $(s_i, a)$ for all tuples $(s_i, a_i, s_{i+1}, r_i)$ in the sample data set D $\{(s_i, a_i, s_{i+1}, r_i)\}$ and for each action in the set of all possible actions (a ∈ A).
for t = 1 ... n do
    Initialize a matrix A and a vector b.
    for $(s_i, a_i, s_{i+1}, r_i)$ in D do
        Select a* = argmax$_a$ Q $(s_{i+1}, a)$.
        Generate vector $\varphi(s_i, a_i), \varphi(s_{i+1}, a^*)$ from the output layer of the neural network.
        Update matrix A and vector b:
            A = A + $\varphi(s_i, a_i)(\gamma\varphi(s_{i+1}, a^*) - \varphi(s_i, a_i))^T$
            b = b + $\varphi(s_i, a_i) r_i$
    end
    Compute weight vector ω = $-A^{-1}b$.
    for $(s_i, a_i, s_{i+1}, r_i)$ in D do
        Select a* = argmax$_a$ Q$(s_i, a)$ = $\varphi(s_i, a)^T \omega$.
        Set training target = Q $(s_i, a^*)$ = $\varphi(s_i, a^*)^T \omega$.
        Perform a gradient descent step on $(\varphi(s_i, a^*)^T \omega - Q (s_i, a_i))^2$
    end
end

---

Figure 6:
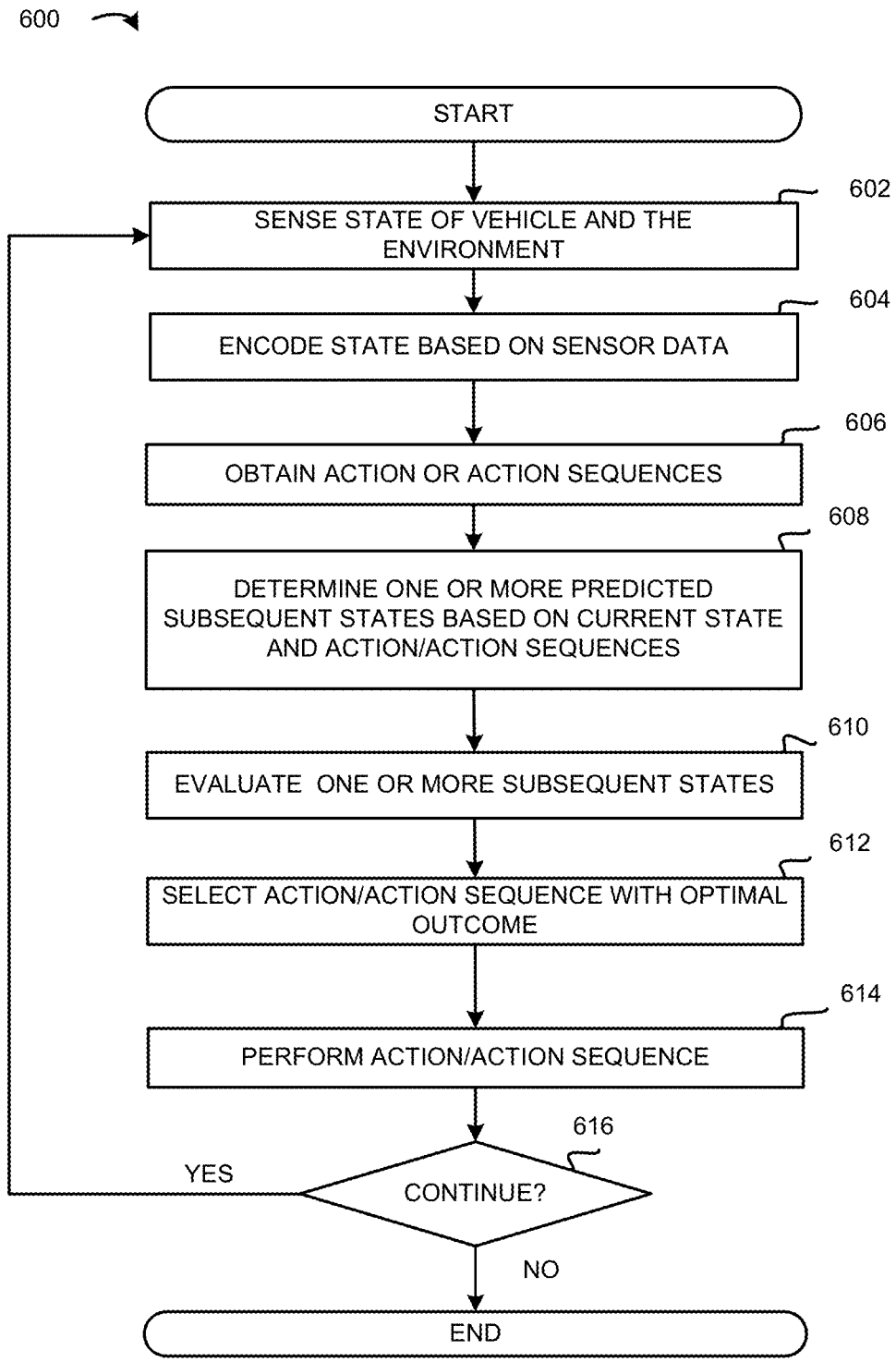
FIG. 6 is a flowchart illustrating an example method of performing an autonomous operation of an object using a neural network in accordance with one example embodiment of the present disclosure.

Referring to FIG. 6, an example method 600 of performing an autonomous operation for a vehicle using a neural network (e.g., autonomous parking or driving) in accordance with one example embodiment of the present disclosure will be described. The method 600 is initiated by the vehicle control system 115 when in an autonomous mode that may be initiated in response to input from a user or may be initiated automatically without input from the user in response to detection of one or more triggers. The method 600 may be carried out by software executed by a processor, such as the neural network controller or a processor 102 of the vehicle control system 115.

At operation 602, the vehicle control system 115 senses a state of the vehicle and an environment of the vehicle 105 using the sensors 110 to obtain sensor data 182 that is provided to the neural network 104. The neural network 104 receives image data 312 derived from the raw inputs received from the cameras 112, LIDAR data derived from the raw inputs received from the LIDAR units 114, RADAR data derived from the raw inputs received from the SAR units 116, and other sensor data 318 derived from measurements obtained by the other sensors 120. At operation 604, the neural network 104 uses the sensor data 182 to encode a state, s, representing the vehicle 105 in the environment.

At operation 606, the neural network 104 receives at least one action from the vehicle control system 115. In some examples, a plurality of action sequences, each comprising one or more actions denoted a1, a2, . . . ak, are received from the vehicle control system 115. Each action, a, is defined by an action vector comprising a steering angle for the steering unit 152, a throttle value for a throttle unit 156 and a braking value for a braking unit 154. It will be appreciated that the steering angle, throttle value and braking value may have a value of zero in some scenarios.

At operation 608, the neural network 104 determines at least one predicted subsequent state, s', of the vehicle 105 in the environment using the current state, s, and the at least one action. In some examples, the neural network 104 determines a predicted subsequent state, s', of the vehicle 105 in the environment using the current state for each of the actions, a1, a2, . . . ak of each action sequence. In such examples, the neural network 104 predicts a plurality of state sequences comprising a plurality of subsequent states, s', of the vehicle 105 in the environment after taking each of the k actions starting from the current state, s, for each action sequence. The neural network 104 uses the encoded state, s, and first action, a1 from a particular action sequence to determines a first predicted subsequent state of the vehicle in the environment, $s'_{a1}$ for that action sequence. The neural network 104 uses the first predicted subsequent state, $s'_{a1}$, and the second action, a2 for the particular action sequence to determine a second predicted subsequent state of the vehicle in the environment, $s'_{a2}$, and so on so forth up to the kth action, for each of the action sequences.

At operation 610, the neural network 104 evaluates the possible outcomes based on the current state, s, by determining a policy value Q (s, a) of the policy value function for the current state, s, for each of the possible actions, a, or for each action sequence, as the case may be. In some examples, the neural network 104 evaluates the possible outcomes based on the current state, one or more sequences of predicted subsequent states, s', such as a state sequence $s'_{a1}$ $s'_{a2}$, $s'_{ak}$, by determining a plurality of policy values Q (s, a), one for each action in each action or each action sequence, as the case may be.

At operation 612, the neural network 104 selects an action (or action sequence) predicted to have the optimal outcome by selecting an action (or action sequence) that maximizes the value of the policy function, e.g. the action (or action sequence) that corresponds to the maximum value of Q (s, a).

At operation 614, the vehicle 105 performs the selected action or selected action sequence a1, a2, . . . ak. As noted above, each action has multiple dimensions, and in the described example, each action comprises a steering angle for the steering unit 152, a throttle value for a throttle unit 156 and a braking value for a braking unit 154. It will be appreciated that the steering angle, throttle value and braking value may have a value of zero in some scenarios.

At operation 616, the vehicle control system 115 determines whether to continue the method 600, i.e. whether the autonomous mode remains enabled. The vehicle control system 115 repeats the operations 602 to 614 until the autonomous mode is disabled.

In examples in which the neural network 104 is located remotely, the method 600 further comprises sending sensor data 182 acquired by the sensor units 125 in operation 602 to the neural network 104 and receiving the selected action (or action sequences) to be performed by the vehicle control system to 115 from the neural network 104. When the neural network 104 is located in the vehicle 105, for example as part of the vehicle control system 115, these operations are not performed.

The present disclosure provides a method of training a neural network. The method is particularly advantageous in training a neural network to perform an autonomous operation such as a parking operation. During a parking operation, the environment is dynamic and changes frequently and sometimes dramatically. Linear programming cannot account for these problems in real-time, nor do greedy local search methods that rely on a heuristic and therefore do not consider other options or possible actions obviating a global optimum solution.

The reinforcement learning provided by the present disclosure provides a mechanism to define a policy that may be used in dynamic environments. Simulation through reinforcement learning is used to develop a policy for a given state and to associate an action for the state that leads to optimal results. The appropriate action may be the action that is the most efficient, preferred, or most appropriate in the circumstances. Thus, an optimal policy may be determined so that the autonomous operation (e.g., parking operation) may be successfully completed.

With respect to parking operations, the neural network may be trained to handle many different types of parking scenarios, such as forward, backward, parallel, etc. or driving scenarios. In the reinforcement learning process, a policy is developed for each possible state of the vehicle in the environment. An appropriate action (e.g., preferred action) for the state is determined as part of the policy.

The method of the present disclosure may continually optimize the selection of actions to be performed by the vehicle control system 115 during the autonomous operation (e.g., parking or driving) by simulating possible actions taken during the course of implementing the parking operation through reinforcement learning. The method is dynamic and iterative, and the operations of the method should not be viewed as being limited to being performed in any particular order.

The present disclosure provides a method and system that uses a neural network to predict a policy value of an observed state based on sensor data from one or more cameras, LIDAR, RADAR and other sensors together with a number of actions. Target policy values of state-action pairs is determined using an approximate policy iteration procedure that uses the sample set of data and a feature mapping from the last layer (i.e. output layer) of the neural network. When trained, the neural network can be used to find parking spots and executing parking at the same time, or other autonomous operation. The teachings of the present disclosure provide a learning-based parking solution based on deep reinforcement learning. Compared with other deep reinforcement learning approaches such as the DQN, the method of the present disclosure increases the likelihood that the training process produces a reliable policy that may be used for vehicle driver assistance and/or vehicle automation, provide such a policy in less time than the DQN. For at least these reasons, it is believed that the method of the present disclosure may provide more stable control and performance of a vehicle when trained for perform vehicle driver assistance and/or vehicle automation.

Although the present disclosure has been described in the context of example methods for autonomous driving or parking operations, it is contemplated that the methods described herein could be used in other AI applications to predict a subsequent state of another type of object and its environment, which may be real or virtual, using a neural network and selection of an action for that object. For example, the methods of the present disclosure may be used in gaming or other simulated CGI applications, industrial robotics, or drone navigation.

Further, it will be appreciated that the methods and apparatus disclosed herein may be adapted beyond any vehicle to other applications that are susceptible to the formulation of the "state-action-subsequent state" dynamic, such as robotic applications. Examples include industrial machinery, photography, office equipment, power generation and transmission.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory 126 of the vehicle control system 115 or a memory of a neural network controller (not shown). The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A system, comprising:
   a processor;
   a memory coupled to the processor, the memory storing executable instructions that, when executed by the processor, cause the processor to:
   receive a sample data set D $\{(s_i, a_i, s_{i+1}, r_i)\}$, wherein s, is a current state of an object in an environment, $a_i$ is an action chosen for the current state, $s_{i+1}$ is a subsequent state of the object and the environment and $r_i$ is a reward value for taking the action, $a_i$, in a current state, $s_i$, a value of which is determined in accordance with a reward function;
   apply, to the sample data set, a multi-layer neural network, each layer in the multi-layer neural network comprising a plurality of nodes, each node in each layer having a corresponding weight, wherein the neural network is configured to:
   (i) generate a first set of policy values $Q(s_i, a_i)$ for each state-action pair $s_i$, $a_i$ in the sample data set D using an action-value function denoted a Q function;
   (ii) generate a second set of policy values Q $(s_{i+1}, a_i)$ for each subsequent state $s_{i+1}$ for all tuples $(s_i, a_i, s_{i+1}, r_i)$ in the sample data set D for each action in a set of all possible actions using the Q function;
   (iii) generate an approximate action-value function, denoted a a Q* function and the apporximates policy values of a state-action pair (s, a) following a policy value function, from the first set of policy values $Q(s_i, a_i)$ for the current state $s_i$ and the action $a_i$ selected for the current state $s_i$ and the second set of policy values Q $(s_{i+1}, a)$ for the subsequent state $s_{i+1}$ after the action $a_i$, the neural network configured to generate the Q* function using an approximate policy iteration (API) procedure by;
   initializing a matrix A and a vector b;
   for each tuple $(s_i, a_i, s_{i+1}, r_i)$ in the sample data set D:
   selecting an action, a*, that results in maximum value of Q $(s_{i+1}, a)$ from a set of all possible actions (a*=$\operatorname{argmax}_a Q$ $(s_{i+i}, a)$);
   generating a vector from an output layer of the neural network $\varphi(s_i, a_i)$, $\varphi^*(s_{i+1}, a^*)$ using $\phi(s)$ and tabular action;
   updating a value of the matrix A and the vector b using the following equations $$A = A + \varphi(s_i, a_i)(\gamma \varphi(s_{i+1}, a^*) - \varphi(s_i, a_i))^T,$$

$$b = b + \varphi(s_i, a_i)r_i,$$

wherein γ is a discount factor between 0 and 1; and
   calculating a weight vector ω according to the following equation:

$$\omega = -A^{-1}b;$$

(iv) generate a training target for the neural network using the Q* function;
   (v) calculate a training error as a difference between the training target and a policy value Q $(s_i, a_i)$ for a corresponding state-action pair in the sample data set D; and
   (vi) train the neural network by updating at least some parameters of the neural network to minimize the training error through back propagation.

2. The system of claim 1, wherein operations (iii) to (vi) are repeated for each tuple $(s_i, a_i, s_{i+1}, r_i)$ in the sample data set D.

3. The system of claim 1, wherein the weight vector ω represents the weights of the nodes of the output layer of the neural network.

4. The system of claim 1, wherein the neural network is configured to generate a training target by:
   selecting an action, a*, that results in maximum value of Q $(s_i, a)^T \omega$ from a set of all possible actions $(a^* = \operatorname{argmax}_a Q(s_i, a) = \varphi(s_i, a)^T \omega)$; and setting the training target for the neural network as $Q(s_i, a^*) = \omega(s_i, a^*)^T \omega$.

5. The system of claim 1, wherein the at least some of the parameters of the neural network are updated using a gradient descent that minimizes a mean square error (MSE) between the training target and the policy value $Q(s_i, a_i)$ for the corresponding state-action pair in the sample data set D.

6. The system of claim 5, wherein the MSE is minimized using a least mean square (LMS) algorithm.

7. The system of claim 5, wherein the MSE is defined in accordance with the following equation:

$$\sum_{i=1}^{n} (\varphi(s_i, a^*)^T \omega - Q(s_i, a_i))^2$$

wherein n is a number of tuples in the sample data set D, $\varphi(s_i, a^*)^T \omega$ is the training target and $Q(s_i, a_i)$ is the policy value for the corresponding state-action pair in the sample data set D, and wherein the sum is first over the states in the sample data set and then over all the actions.

8. The system of claim 1, wherein the state of the object in the environment is sensed using one or more of cameras, LIDAR and RADAR, wherein the current state of the object in the environment is described by one or more of images, LIDAR measurements and RADAR measurements.

9. The system of claim 1, wherein the action comprises any one or a combination of a steering angle for a steering unit, a throttle value for a throttle unit and braking value for a braking unit.

10. The system of claim 1, wherein the object is a vehicle, robot or drone.

11. The system of claim 1, wherein the reward value generated by the reward function is based on each of a plurality of subsequent states of an action sequence, wherein the action sequence corresponds to a parking or driving operation.

12. The system of claim 11, wherein the reward value is the sum of all rewards for all subsequent states in the action sequence.

13. The system of claim 1, wherein the state of the object in the environment is sensed using a combination of two or more of cameras, LIDAR and RADAR, wherein the current state of the object in the environment is described by one or more of images, LIDAR measurements and RADAR measurements.

14. The system of claim 1, wherein the reward value generated by the reward function is based on each of a plurality of subsequent states of an action sequence, wherein the action sequence corresponds to a parking or driving operation, wherein the reward value is the sum of all rewards for all subsequent states in the action sequence, wherein the state of the object in the environment is sensed using a combination of two or more of cameras, LIDAR and RADAR, wherein the current state of the object in the environment is described by one or more of images, LIDAR measurements and RADAR measurements.

15. A method of training a neural network, comprising:
(i) generating a first set of policy values $Q(s_i, a_i)$ for each state-action pair $s_i$, $a_i$ in a sample data set D $\{(s_i, a_i, s_{i+1}, r_i)\}$ using an action-value function denoted a Q function, wherein $s_i$ is a current state of an object in an environment, $a_i$ is an action chosen for the current state, $s_{i+1}$ is a subsequent state of the object in the environment and $r_i$ is a reward value for taking the action, $a_i$, in a current state, $s_i$, a value of which is determined in accordance with a reward function;
(ii) generating a second set of policy values $Q(s_{i+1}, a)$ for each subsequent state $s_{i+1}$ for all tuples $(s_i, a_i, s_{i+1}, r_i)$ in the sample data set D for each action in a set of all possible actions using the Q function;
(iii) generating an approximate action-value function, denoted a Q* function and that approximates policy values of a state-action pair (s, a) following a policy value function, from the first set of policy values $Q(s_i, a_i)$ for the current state $s_i$ and the action $a_i$ selected for the current state $s_i$ and the second set of policy values $Q(s_{i+1}, a)$ for the subsequent state $s_{i+1}$ after the action $a_i$, wherein generating the Q* function using an approximate policy iteration (API) procedure by:
initializing a matrix A and a vector b;
for each tuple $(s_i, a_i, s_{i+1}, r_i)$ in the sample data set D:
selecting an action, a*, that results in maximum value of $Q(s_{i+1}, a)$ from a set of all possible actions ($a^* = \mathrm{argmax}_a Q(s_{i+1}, a)$);
generating a vector from an output layer of the neural network $\varphi(s_i, a_i)$, $\varphi^*(s_{i+1}, a^*)$ using $\phi(s)$ and tabular action; and
updating a value of the matrix A and the vector b using the following equations $A = A + \varphi(s_i, a_i)(\gamma \varphi(s_{i+1}, a^*) - \varphi(s_i, a_i))^T,$ $b = b + \varphi(s_i, a_i) r_i,$ wherein $\gamma$ is a discount factor between 0 and 1; and
calculating a weight vector w according to the following equation:

$\omega = -A^{-1} b;$ (iv) generating a training target for the neural network using the Q* function;
(v) calculating a training error as a difference between the training target and the policy value $Q(s_i, a_i)$ for a corresponding state-action pair in the sample data set D; and
(vi) training the neural network by updating at least some parameters of the neural network to minimize the training error through back propagation.

16. The method of claim 15, wherein operations (iii) to (vi) are repeated for each tuple $(s_i, a_i, s_{i+1}, r_i)$ in the sample data set D.

17. The method of claim 15, wherein the weight vector $\omega$ represents the weights of the nodes of the output layer of the neural network.

18. The method of claim 15, wherein generating the training target comprises:
selecting an action, a*, that results in maximum value of $\varphi(s_i, a)^T \omega$ from a set of all possible actions ($a^* = \mathrm{argmax}_a Q(s_i, a) = \varphi(s_i, a)^T \omega$); and
setting the training target for the neural network as $Q(s_i, a^*) = \varphi(s_i, a^*)^T \omega$.

19. The method of claim 15, wherein the at least some of the parameters of the neural network are updated using a gradient descent that minimizes a mean square error (MSE) between the training target and the policy value $Q(s_i, a_i)$ for the corresponding state-action pair in the sample data set D.

20. The method of claim 19, wherein the MSE is minimized using a least mean square (LMS) algorithm.

21. The method of claim 19, wherein the MSE is defined in accordance with the following equation:

$$\sum_{i=1}^{n} (\varphi(s_i, a^*)^T \omega - Q(s_i, a_i))^2$$

wherein n is a number of tuples in the sample data set D, $\varphi(s_i,a^*)^T\omega$ is the training target and Q $(s_i,a_i)$ is the policy value for the corresponding state-action pair in the sample data set D, and wherein the sum is first over the states in the sample data set and then over all the actions.

22. The method of claim 15, wherein the state of the object in the environment is sensed using one or more of cameras, LIDAR and RADAR, wherein the current state of the object in the environment is described by one or more of images, LIDAR measurements and RADAR measurements.

23. The method of claim 15, wherein the action comprises any one or a combination of a steering angle for a steering unit, a throttle value for a throttle unit and braking value for a braking unit.

24. The method of claim 15, wherein the object is a vehicle, robot or drone.

25. A vehicle control system, comprising:
a plurality of sensors for sensing a current state of an object and an environment in which the object is located;
a processor to the plurality of sensors, the processor configured to:
encode a current state representing a vehicle in the environment in accordance with sensor data received from the plurality of sensors;
a neural network coupled to the processor, the neural network trained according to the method of claim 15, the neural network configured to:
receive a plurality of possible actions;
determine a predicted subsequent state of the vehicle in the environment based on the current state for each possible action in the plurality of possible actions;
for each action in the plurality of possible actions, evaluate the predicted subsequent state by determining a policy value in accordance with a policy value function, the predicted subsequent state and the respective action in the plurality of possible actions; and
select an action from the plurality of possible actions determined to generate a maximum policy value.

26. The vehicle control system of claim 25, wherein the vehicle control system causes the vehicle to perform the selected action.

27. The vehicle control system of claim 25, wherein each possible action is defined by an action vector comprising a steering angle for a steering unit, a throttle value for a throttle unit and a braking value for a braking unit.

28. The vehicle control system of claim 25, wherein the policy function maximizes a reward associated with predicted subsequent state.

29. The vehicle control system of claim 25, wherein the neural network is configured to:
receive a plurality of possible action sequences, each possible action sequences comprising one or more actions;
for each possible action sequences:
determine one or more predicted subsequent states of the vehicle in the environment based on the current state for each possible action in the possible action sequence; and
evaluate each of the one or more predicted subsequent by determining a policy value in accordance with a policy value function, the predicted subsequent state and the respective action in the possible action sequence; and
select an action sequence from the plurality of possible action sequences determined to generate a maximum policy value.

30. The vehicle control system of claim 29, wherein the neural network is configured to:
for each possible action sequence, predict a plurality of state sequences each comprising a plurality of predicted subsequent states of the vehicle in the environment after performing each possible action sequence in the respective possible action sequence.

31. The vehicle control system of claim 29, wherein each predicted subsequent state in a state sequence is based on a previously observed or predicted state and a possible action in the possible action sequence.

32. The vehicle control system of claim 29, wherein the policy value function maximizes a reward based on each of a plurality of predicted subsequent states for each possible action sequence.

33. The vehicle control system of claim 29, wherein the action sequence is a parking or driving operation.

34. The vehicle control system of claim 32, wherein the reward is based on proximity to an optimum performance of the action sequence.

35. A method of performing an autonomous operation of a vehicle, comprising:
encoding a current state representing a vehicle in an environment in accordance with sensor data received from a plurality of sensors;
at a neural network trained according to the method of claim 15:
receiving a plurality of possible actions;
determining a predicted subsequent state of the vehicle in the environment based on the current state for each possible action in the plurality of possible actions;
for each action in the plurality of possible actions, evaluating the predicted subsequent state by determining a policy value in accordance with a policy value function, the predicted subsequent state and the respective action in the plurality of possible actions; and
selecting an action from the plurality of possible actions determined to generate a maximum policy value.

36. A non-transitory machine readable medium having tangibly stored thereon executable instructions for execution by a processor of a computing device, wherein the executable instructions, when executed by the processor of the computing device, cause the computing device to:
(i) generate a first set of policy values $Q(s_i,a_i)$ for each state-action pair $s_i$, $a_i$ in a sample data set D $\{(s_i, a_i, s_{i+1},r_i)\}$ using an action-value function denoted a Q function, wherein $s_i$ is a current state of an object in an environment, $a_i$ is an action chosen for the current state, $s_{i+1}$ a subsequent state of the object in the environment and $r_i$ is a reward value for taking the action, $a_i$, in a currrent state, $s_i$, a value of which is determined in accordance with a reward function;
(ii) generate a second set of policy values Q $(s_{i+1},a)$ for each subsequent state $s_{i+1}$ for all tuples $(s_i, a_i, s_{i+1},r_i)$ in the sample data set D for each action in a set of all possible actions using the Q function;

(iii) generate an approximate action-value function, denoted a Q* function, and that approximates policy values of a state-action pair (s, a) following a policy value function, from the first set of policy values $Q(s_i,a_i)$ for the current state $s_i$ and the action $a_i$ selected for the current state $s_i$ and the second set of policy values $Q(s_{i+1},a)$ for the subsequent state $s_{i+1}$ after the action $a_i$, the neural network configured to generate the Q* function using an approximate policy iteration (API) procedure by:

initializing a matrix A and a vector b;

for each tuple $(s_i, a_i, s_{i+1}, r_i)$ in the sample data set D:

selecting an action, a*, that results in maximum value of $Q(s_{i+i}, a)$ from a set of all possible actions (a*=argmax$_a Q(s_{i+1}, a)$);

generating a vector from an output layer of the neural network $\varphi(s_i,a_i)$, $\varphi^*(s_{i+1},a^*)$ using $\phi(s)$ and tabular action;

updating a value of the matrix A and the vector b using the following equations $$A = A + \varphi(s_i,a_i)(\gamma\varphi(s_{i+1},a^*) - \varphi(s_i,a_i))^T,$$

$$b = b + \varphi(s_i,a_i)r_i,$$

wherein y is a discount factor between 0 and 1; and calculating a weight vector co according to the following equation:

$$\omega = -A^{-1}b;$$

(iv) generate a training target for a neural network using the Q*-function;

(v) calculate a training error as a difference between the training target and a policy value $Q(s_i, a_i)$-for a corresponding state-action pair in the sample data set D; and (vi) train the neural network by updating at least some parameters of the neural network to minimize the training error through back propagation.

\* \* \* \* \*

UNITED STATES PATENT AND TRADEMARK OFFICE
CERTIFICATE OF CORRECTION

PATENT NO. : 11,688,160 B2
APPLICATION NO. : 16/248543
DATED : June 27, 2023
INVENTOR(S) : Hengshuai Yao It is certified that error appears in the above-identified patent and that said Letters Patent is hereby corrected as shown below:

In the Claims

In Column 19, Line 66, "receive a sample data set $D$ $\{(s_i, a_i, s_{i+1}, r_i)\}$, wherein S" should read -- receive a sample data set $D$ $\{(s_i, a_i, s_{i+1}, r_i)\}$, wherein $s_i$ --.

In Column 20, Line 3, "and $r_j$ is a reward value for taking the action, $a_i$, in a" should read -- and $r_j$ is a reward value for taking the action, $a_i$, in the --.

In Column 20, Line 15, "(ii) generate a second set of policy values $Q(s_{i+1}, a_i)$" should read -- (ii) generate a second set of policy values $Q(s_{i+1}, a)$ --.

In Column 20, Line 20, "denoted a a Q* function and the apporximates" should read -- denoted a Q* function and the approximates --.

In Column 20, Line 44, "calculating a weight vector co according to the" should read -- calculating a weight vector $\omega$ according to the --.

In Column 22, Line 1, "in a current state, $s_i$, a value of which is determined in" should read -- in the current state, $s_i$, a value of which is determined in --.

In Column 22, Line 14, "values $Q(s_{i+1}, a)$ for the subsequent state $s_{i+}$ after the" should read -- values $Q(s_{i+1}, a)$ for the subsequent state $s_{i+1}$ after the --.

In Column 22, Line 34, "calculating a weight vector w according to the fol-" should read -- calculating a weight vector $\omega$ according to the fol- --.

In Column 22, Line 41, "training target and the policy value $Q(s_i, a_i)$ for a" should read -- training target and a policy value $Q(s_i, a_i)$ for a --.

Signed and Sealed this
Fifteenth Day of October, 2024

Katherine Kelly Vidal
*Director of the United States Patent and Trademark Office*

In Column 26, Line 8, "calculating a weight vector co according to the" should read -- calculating a weight vector $\omega$ according to the --.